United States Patent [19]

Horn et al.

[11] Patent Number: 5,155,084
[45] Date of Patent: Oct. 13, 1992

[54] SUPPORTED CATALYSTS AND A PROCESS FOR THEIR PREPARATION

[75] Inventors: Gerhardt Horn, Oberhausen; Carl D. Frohning, Wesel, both of Fed. Rep. of Germany

[73] Assignee: Hoechst Aktiengesellschaft, Fed. Rep. of Germany

[21] Appl. No.: 743,193

[22] Filed: Aug. 9, 1991

[30] Foreign Application Priority Data

Aug. 11, 1990 [DE] Fed. Rep. of Germany ....... 4025525

[51] Int. Cl.$^5$ .................... B01J 21/14; B01J 23/74; B01J 37/02
[52] U.S. Cl. ..................... 502/252; 502/259
[58] Field of Search ............. 502/234, 252, 259

[56] References Cited

U.S. PATENT DOCUMENTS

| | | | |
|---|---|---|---|
| 2,548,159 | 4/1951 | Houtman et al. | 502/234 |
| 3,321,534 | 5/1967 | Landgraf et al. | 502/234 |
| 4,251,394 | 2/1981 | Carter et al. | 502/234 |
| 4,307,248 | 12/1981 | Barnett et al. | 564/358 |
| 4,318,829 | 3/1982 | Halluin et al. | 252/466 J |
| 4,368,142 | 1/1983 | Frohning et al. | 502/259 |

FOREIGN PATENT DOCUMENTS

| | | | |
|---|---|---|---|
| 31472 | 7/1981 | European Pat. Off. | |
| 340848 | 11/1989 | European Pat. Off. | |
| 398668 | 11/1990 | European Pat. Off. | |
| 903357 | 8/1962 | United Kingdom | 502/252 |

*Primary Examiner*—Carl F. Dees
*Attorney, Agent, or Firm*—Jordan B. Bierman

[57] ABSTRACT

Supported catalysts containing nickel, magnesium oxide and, if desired, further additives, which contain reduced Mg and Ni in a molar ratio of (0.0075 to 0.075):1. The catalyst also have an active nickel metal surface area of 110 to 180 m$^2$/g of Ni, and a BET total surface area of 160 to 450 m$^2$/g. The invention furthermore relates to a process for the preparation of the catalysts and to their use as catalysts for the hydrogenation of aliphatic and/or aromatic hydrocarbons.

24 Claims, No Drawings

SUPPORTED CATALYSTS AND A PROCESS FOR THEIR PREPARATION

This Application claims the benefit of the priority of German 40 25 525.5, filed Aug. 11, 1990.

The present invention relates to supported catalysts containing nickel, magnesium oxide and, if desired, further additives, and having a narrow distribution of pore radii; a process for their preparation, starting from aqueous solutions containing nickel salts and magnesium salts from which a coprecipitate is formed by a basic precipitant; and to their use.

BACKGROUND OF THE INVENTION

EP 322,049 A1 describes a nickel/silica catalyst which may, if desired, contain a cation of a metal X from group II of the Periodic Table of the Elements (IUPAC version). Mg is described as being the particularly preferred X. The catalyst is distinguished in its reduced state by an $SiO_2$:Ni molar ratio of (0.15 to 0.35):1, an X:Ni molar ratio of (0 to 0.15):1, an active nickel surface area of more than 120 $m^2/g$, a BET surface area wherein at least 40% of the pores have a pore radius above 2.5 nm (25 Å) and a nickel content of at least 50%. In particular, the percentage of the surface having pores of a pore radius $r_P$ above 2.5 nm (25 Å) is supposed to be important for the activity and selectivity of the catalyst. This percentage should be at least 40% and preferably exceed 45%.

The catalysts are prepared by adding, in a first step, a basic precipitant in excess continuously to a solution containing nickel salts and magnesium salts and then, in a second step adding aqueous silicate solution continuously to the coprecipitate thus obtained, collecting the precipitate formed, for example by filtration, and then drying and reducing it. The residence time to be observed in each case is short. It is 20 to 120 seconds in the first step and 40 to 300 seconds in the second step.

SUMMARY OF THE PRESENT INVENTION

The present invention relates to a new catalyst distinguished by a narrow distribution of the pore radii and containing Mg and Ni in reduced form, in a molar ratio of (0.0075 to 0.075):1 and 17.0 to 60.0 grams of a water insoluble support per mole of Ni. The Ni has an active nickel metal surface area of 110 to 180 $m^2/g$ and 65% to 97% of the BET total surface area is formed by pores having a radius $r_P \leq 2.5$ nm.

An essential feature of the catalyst according to the invention is the narrow distribution of the pore radii, expressed by a high proportion of the BET total surface area in which the pores have a radius $r_P \leq 2.5$ nm. BET total surface area is understood to mean the surface area determined by adsorption of nitrogen by the Brunauer, Emmett and Teller method (BET), described in J. Amer. Chem. Soc. 60, (1938) 309. The BET total surface area is 160 to 450, in particular 180 to 380, preferably 200 to 350 $m^2/g$ of catalyst.

The above-mentioned narrow distribution of the pore radii with its maximum in the range of $r_P \leq 2.5$ nm gives the catalyst according to the invention special properties, resulting in an increase in activity and improvement in selectivity in a number of reactions.

A further feature of the new catalyst is its composition, expressed by the molar ratio of Mg to Ni. For the sake of completeness, attention may be drawn to the following definition. 1 mol of Mg or 1 mol of $Mg^{2+}$ corresponds to 24.305 g of Mg or 24.305 g of $Mg^{2+}$ and 1 mol of Ni or 1 mol of $Ni^{2+}$ corresponds to 58.71 g of Ni or 58.71 g of $Ni^{2+}$. In the reduced state of the catalyst, magnesium is present as $Mg^{2+}$ and nickel predominantly or almost completely in metallic form. Therefore, molar ratio is understood in its more precise formulation as the ratio of mols of $Mg^{2+}$: (mols of Ni and mols of non-reduced $Ni^{2+}$).

The composition of the novel catalyst is furthermore determined by the ratio of parts by weight of the water-insoluble support to Ni, which in this case again is understood to mean the sum of moles of metallic nickel and moles of $Ni^{2+}$. As already mentioned above, the catalyst according to the invention contains in its reduced form Mg and Ni in a molar ratio of (0.0075 to 0.075):1. It has proved particularly suitable to select an Mg:Ni molar ratio of (0.015 to 0.060):1, in particular (0.022 to 0.055):1.

Suitable supports are various water-insoluble materials. They include silicates, such as calcium silicates, magnesium silicates and/or aluminum silicates; $Al_2O_3$; $SiO_2$; and/or kieselguhr. Particularly useful supports which should be mentioned are magnesium silicates, in particular in the form of pumice, $Al_2O_3$, $SiO_2$, and/or kieselguhr, preferably $SiO_2$ and/or kieselguhr. The support can comprise two or more of the aforementioned materials. In most cases, it has proved favorable to use only one of the materials as the support.

The support material should usually be present in finely divided form. Its particles should have the narrowest possible particle size distribution. Since the particle size also affects properties of the catalyst after its preparation, for example filterability, bulk density, deformability and catalyst surface area, the selection of the particle size is of some importance.

The support particles should have a particle size of 1 to 30, in particular 2 to 25, preferably 3 to 20 μm. Their particle size should be adjusted to the desired properties of the ready-to-use catalyst present in reduced form.

The catalyst contains 17.0 to 60.0, in particular 25 to 50, preferably 30 to 40, grams of support per mole of Ni. As already mentioned above, moles of Ni is understood to mean the sum of nickel in reduced and non-reduced form.

The active nickel metal surface area of the catalyst is 110 to 180, in particular 120 to 160, preferably 130 to 150, $m^2/g$ of Ni. It is determined using a method described in more detail in Journal of Catalysis 81, (1983) 204 and 96, (1985) by measuring the amount of hydrogen absorbed at 20° C. by chemisorption.

Of the BET total surface area, 65 to 97, in particular 70 to 95, preferably 75 to 95, % is formed by pores of a radius $r_P \leq 2.5$ nm (25 Å). The pore radii are determined by a method described in more detail in S. J. Gregg and K. S. W. Sing, Adsorption Surface Area and Porosity (Academic Press, New York, London 1967) pages 160 to 182. The catalyst according to the invention is further distinguished in that 60 to 95, in particular 70 to 95, preferably 73 to 90, % of the BET total surface area are formed by pores having a radius $r_P$ of 1.5 to 2.5 nm (15 to 25 Å). Pores of radii $r_P$ of 1.8 to 2.5 nm (18 to 25 Å) form 35 to 85, in particular 45 to 76, preferably 50 to 70, % of the BET total surface area.

The distribution of the pore radii, expressed by the percentage of the BET total surface area formed by pores of radius $r_P \leq 2.5$ nm (25 Å), is related to the size of the BET total surface area. The larger the BET total surface are, the higher in general the percentage of the BET surface area formed by pores of radius $r_P \leq 2.5$ nm. A very particular feature of the catalyst according to the invention is that the predominant proportion ($\geq 60\%$) of the BET total surface area is due to pores having radii $r_P$ of 1.5 to 2.5 nm.

The process for the preparation of the catalyst according to the invention starts from an aqueous solution containing nickel salts and magnesium salts. This mixed salt solution contains 10 to 100, in particular 20 to 80, preferably 30 to 50, g of Ni/l. It contains magnesium in an amount of 0.2 to 15, in particular 0.5 to 12, preferably 1 to 10, g of MgO/l.

The mixed salt solution is prepared by dissolving water-soluble, inorganic, organic or complex salts of nickel and magnesium in water. Very suitable salts are sulfates, chlorides, acetates, propionates, butyrates and nitrates. It has proven particularly suitable to use nickel and magnesium in the form of their sulfates, chlorides, acetates and nitrates, preferably in the form of their nitrates.

In order to prevent undesired hydrolysis and to influence the precipitation in a favorable manner, it is recommended to provide an excess of free acid in the mixed salt solution. The mixed salt solution should contain free acid in accordance with an $H^+:Mg^{2+}$ ratio of (0.01 to 0.2):1, in particular (0.02 to 0.1):1, preferably (0.03 to 0.06):1. The free acid is determined by titration with NaOH until reaching a pH of 0.8. The free acids used can be mineral acids, such as hydrochloric acid, sulfuric acid and nitric acid. Nitric acid is particularly suitable.

The mixed salt solution is transferred separately but simultaneously together with an aqueous solution of a basic precipitant to a support suspended in water. The compound which serves as precipitant is an aqueous solution of a basic compound, in particular an aqueous alkali metal carbonate, alkali metal hydrogen carbonate, alkali metal hydroxide, ammonium hydroxide, or ammonium carbonate solutions. Mixtures of these solutions can also be used. An aqueous solution containing $Na_2CO_3$ and/or $NaHCO_3$ is particularly suitable. The precipitant should have a pH of 7.5 to 13, preferably 8 to 12, most preferably 9 to 11.

The aqueous solution contains 0.1 to 4.0, in particular 0.6 to 3.0, preferably 1.6 to 2.4, equivalents of basic compound/liter of solution. Fairly good results are achieved with aqueous solutions containing 0.3 to 1.5, preferably 0.8 to 1.2, mols of alkali metal carbonate/liter of solution.

In order to ensure complete precipitation and, at the same time, to obtain a particularly homogeneous coprecipitate comprising basic nickel compounds and magnesium compounds, the basic compound is used in slight excess. The stoichiometric excess is in general 0.5 to 10, preferably 1 to 7, % of basic compound. The use of 2 to 5% of excess basic compound has proven particularly suitable. The excess relates in each case to the amount of basic compound required for complete precipitation of Ni and Mg.

The stoichiometric excess should be such that, on the one hand, the precipitation of a completely homogeneous Ni-Mg coprecipitate is ensured but, on the other hand, precipitation of the metal ions present in the mixed salt solution takes place to the extent desired in each case. Precipitation is best effected by adding, with mixing, the mixed salt solution and the precipitant separately but simultaneously, continuously or batchwise to the support material suspended in water and suitable for the preparation of the catalyst. Support materials which may be used are the substances already mentioned, i.e. silicates of calcium, magnesium and/or aluminum, $Al_2O_3$, $SiO_2$ and/or kieselguhr.

The support material/water suspension should contain 6 to 100, in particular 10 to 60, preferably 20 to 40, grams of support material/liter of water. Excessively low support material contents should be avoided for reasons of economy, and excessively high support material contents for reasons of stirrability of the resulting suspension.

Precipitation of the coprecipitate comprising basic nickel compounds and magnesium compounds is effected by comparatively slow addition of the mixed salt solution and the precipitant. The precipitation time should be at least 10, in particular at least 15, preferably at least 20, minutes. In most cases, it has proved suitable to maintain a precipitation time of 15 to 120, in particular 20 to 90, preferably 25 to 60, minutes. The precipitation time can be adjusted by selecting a suitable addition rate of mixed salt solution and precipitant, in particular when the precipitation is carried out batchwise. However, when in continuous operation, the throughput relative to the reaction volume must additionally be taken into consideration apart from the addition rates of mixed salt solution and precipitant.

During the precipitation, a constant pH within a pH range of 6 to 8.5, in particular 6.5 to 7.8, is maintained. Variations in the pH should be as low as possible in order to ensure preparation of a particularly homogeneous coprecipitate. The variations in the pH should be limited to an interval from $-0.5$ to $+0.5$, preferably $-0.2$ to $+0.2$.

The precipitation is carried out at temperatures above 80° C., in particular in a range from 90° C. to 110°, preferably 95° to 105° C. To achieve this, the substances involved in the precipitation, i.e. the mixed salt solution, the precipitant and the support material/water suspension, need only to be brought to an appropriately high temperature. During the precipitation, the temperatures should be kept as constant as possible. Deviations from the predetermined temperature should not exceed $\pm 2$, in particular $\pm 1$, °C. Variations in the precipitation temperature affect the nature of the coprecipitate, for example particle size and homogeneity, in a disadvantageous manner.

The coprecipitate contains magnesium and nickel in accordance with a molar ratio of (0.02 to 0.25):1, in particular (0.03 to 0.2):1, preferably (0.035 to 0.1):1. After precipitation is complete, it is separated off from the mother liquor. This can be done by decantation and/or filtration.

The coprecipitate is then washed with water, which dissolves the basic magnesium compounds present out of the coprecipitate, as well as the components present in solution, for example $Na^+$ and $NO_3^-$. As a result, the molar ratio of magnesium to nickel is changed and shifted to lower values corresponding to those of the catalyst according to the invention, due to the decrease in magnesium. The precipitate is washed at relatively high temperatures of 60° to 90°, in particular 65° to 85°, preferably 70° to 80°, C. It is also possible to wash it at lower temperatures, in which case, however, considerably longer washing times and larger amounts of wash water have to be accepted.

Dissolution of the magnesium compounds out of the coprecipitate can be influenced by the amount of wash water used, by the flow rate and temperature of the wash water, and by the duration of the washing. Increasing amounts of wash water, high temperatures of the wash water, and long duration of the washing process promote particularly extensive dissolution of the magnesium compounds. Lower amounts of wash water, low temperatures of the wash water, and short duration of the washing process lead to a reduced degree of dissolution of the magnesium compounds. The individual parameters of the washing process, amount, flow rate and temperature of the wash water and duration of washing should be adjusted to one another in the individual case so that the desired amount of magnesium compounds is dissolved out and Mg and nickel are present in accordance with a molar ratio of (0.0075 to 0.075):1, in particular (0.015 to 0.06):1, preferably (0.022 to 0.055):1.

Usually, 80 to 350, in particular 100 to 300, preferably 120 to 180, liters of wash water are used per mole of $Mg^{2+}$ to be dissolved out. The duration of the washing process must be sufficiently long. It should be at least 60, in particular at least 80, preferably at least 90, minutes. A washing time of 75 to 180, in particular 90 to 150, preferably 100 to 135, minutes is usually sufficient.

The washing process can be carried out in a single step or it can take place in several successive steps by distributing the total required amount of wash water accordingly. To which procedure preference is given depends on the individual case. Both a one-step and a multi-step washing process generally lead to the desired result. A multi-step washing process may be required if a coprecipitate having a high magnesium content has to be converted to a product having a low magnesium content.

Control of the washing process is facilitated by determining the dissolved magnesium compounds present in the wash water. Such monitoring can be eliminated if the washing process is carried out under standardized and controlled conditions, for example using a predetermined amount of wash water, temperature, and duration. If desired, the washed material can be shaped into pieces. This shaping can be done using known methods, for example extrusion in strands.

Drying is carried out at elevated temperatures, preferably stepwise with increasing temperatures. It has proven sufficient to perform the drying at temperatures of 50° to 120°, more preferably 55° to 100°, most preferably 60° to 90°, C. using conventional methods, such as arranging the dry material in a fixed bed or in a moving bed, for example as fluidized bed. The reduction of the catalyst composition is carried out using hydrogen at temperatures from 260° to 400°, in particular 280° to 360° C.

The process according to the invention ensures characteristic distribution of the pore radii and surface areas of the catalyst already described above in more detail. By varying the process parameters within the ranges given, the distribution of the pore radii and the surface areas can be modified selectively in the desired direction. Thus, for example, a relatively narrow distribution of the pore radii can be selectively set to the pore radii range from 1.8 nm to 2.5 nm, or alternatively, a broader distribution of the pore radii can be selectively set to the pore radii range from 1.5 nm to 2.5 nm. The further the distribution of the pore radii is shifted to smaller pore radii, the larger the BET total surface area of the catalyst according to the invention.

In addition to the process described above, the present invention also relates to a composition containing Mg and Ni in non-reduced form in accordance with a molar ratio of (0.0075 to 0.075):1 and 17.0 to 60.0 grams of support per mole of Ni and 2 to 25% by weight of water, relative to the composition, in which a coprecipitate deposited in the presence of the support at pH 6 to 8.5, at 90° to 110° C., and having an Mg:Ni molar ratio of (0.02 to 0.25):1 and 17.0 to 60.0 grams of support per mole of Ni is washed with water at 60° to 90° C.

The composition contains magnesium and nickel in non-reduced form in accordance with a molar ratio of especially (0.015 to 0.06):1, preferably (0.022 to 0.055):1. Per mole of Ni, the composition contains desirably 25 to 50, preferably 30 to 40, grams of support and 3 to 20, preferably 4 to 15, % by weight of water, relative to the composition. The coprecipitate to be washed with water contains magnesium and nickel in accordance with a molar ratio of in particular (0.03 to 0.2):1, preferably (0.035 to 0.1):1. The catalyst according to the invention is subsequently prepared from the composition, if desired after shaping and drying.

The inventive catalyst can be advantageously used for hydrogenation of olefinic hydrocarbons and/or aromatic hydrocarbons in liquid phase. Even at moderate temperatures in the range from 80 to 140° C., high conversions and good selectivities are obtained in the reactions tested. This clearly shows the superiority of the new catalyst compared with catalysts of the prior art. Furthermore, the catalyst according to the invention has excellent filtration properties, due to its particle size distribution.

The examples which follow serve to illustrate the present invention without limiting it.

EXAMPLE 1

Preparation of a catalyst of composition 60% by weight of Ni, 1.6% by weight of Mg (calculated as MgO), 36% by weight of kieselguhr as support material, which corresponds to 35.2 g of kieselguhr per mol of Ni.

A mixed salt solution containing 35 g of Ni/liter, magnesium corresponding to 2.1 g of MgO/liter, and 1.5 to 2.5 g of free $HNO_3$/liter is prepared by dissolving 1980 g of $Ni(NO_3)_2.6H_2O$ and 153 g of $Mg(NO_3)_2.6H_2O$ in distilled water with the addition of $HNO_3$.

An aqueous sodium carbonate solution obtained by dissolving $Na_2CO_3$ in distilled water and containing 106 g of $Na_2CO_3$/liter serves as the precipitant. The precipitation is carried out by suspending 240 g of kieselguhr in 8.0 liters of distilled water and heating the suspension to 97° C. 11.4 liters of the mixed salt solution is heated to 97° C. and 8.9 liters of the precipitant (also at 97° C.) is added simultaneously but separately to the stirred suspension. The simultaneous but separate addition of mixed salt solution and precipitant brings the pH of the vigorously stirred suspension to 7.3 to 7.4 within 1 to 5 minutes. During the precipitation, the pH is kept constant at 7.4±0.2 and the temperature at 97°±1° C.

The addition of mixed salt solution and precipitant is at such a rate that it is completed after about 30 to 35 minutes. Immediately afterwards, the mixture is filtered. The filter residue is then washed with 65 liters of hot water at 80° C. over a period of 105 minutes and filtered off again. The filter cake is extruded and air-dried, while increasing the temperature (50° to 75° C.), to a residual water content of <10% by weight of water, based on the dry material. The dry material is reduced in an $H_2$ stream (400 liters of $H_2$ per liter of catalyst per hour) at 280° to 360° C. The reduction is complete after 4 hours.

The catalyst contains about 60% by weight of Ni, magnesium corresponding to 1.6% by weight of MgO, and 36% by weight of kieselguhr which is 35.2 grams of kieselguhr per mole of Ni. About 82% of the BET total surface area are formed by pores having pore radii $r_p \leq 2.5$ nm (25 Å) and about 60% of the BET total surface area by pores of $r_p = 1.8$ to $r_p = 2.5$ nm. The active nickel metal surface area is 140 to 150 m$^2$/g of Ni. The BET total surface area is 230 to 270 m$^2$/g of catalyst.

The catalyst formed is pyrophoric. It is therefore recommended to treat it in a manner known per se with an O$_2$/N$_2$ mixture containing about 0.1 to 1.0% by weight of O$_2$. This treatment makes it relatively insensitive to the effect of air. The catalyst thus stabilized can be more easily handled. As a result of the O$_2$ treatment, the Ni content is reduced to about 57% by weight.

EXAMPLE 2

Hydrogenation of a mixture comprising olefinic and aromatic hydrocarbons by means of a catalyst according to the invention.

400 g of a hydrocarbon mixture containing about 2% by weight of olefinic hydrocarbons and about 22% by weight of aromatic hydrocarbons are initially introduced into a 1 liter autoclave which is equipped with a magnetic piston-type stirrer. 3.53 g of the catalyst prepared according to Example 1 and containing 56.9% by weight of Ni is added ($\cong$0.5% by weight of Ni, relative to the hydrocarbon-mixture). The mixture is then heated to 140° C. with stirring and hydrogenated under a pressure of 20 bar of H$_2$. After 85 minutes, the absorption of hydrogen is complete.

The hydrogenation product formed has only <0.01% by weight of olefinic hydrocarbons and <0.02% by weight of aromatic hydrocarbons.

EXAMPLE 3 (COMPARATIVE EXPERIMENT)

Hydrogenation of a mixture comprising olefinic and aromatic hydrocarbons by means of a conventional catalyst.

400 g of the hydrocarbon mixtures mentioned in Example 2 are used together with 3.64 g of a conventional catalyst containing 55% by weight of Ni, 8% by weight of MgO and 33.1% by weight kieselguhr, which corresponds to 35.225 g of kieselguhr per mole of Ni, and having an active nickel metal surface area of 60 to 70 m$^2$/g Ni and a BET total surface area of 130 to 150 m$^2$/g of catalyst ($\cong$0.5% by weight of Ni, relative to the hydrocarbon mixture). The reaction is carried out as mentioned in Example 2 at 140° C. and 20 bar of H$_2$.

However, the absorption of hydrogen is complete only after 180 minutes. The hydrogenation product formed has <0.01% by weight of olefinic hydrocarbons and <0.02% by weight of aromatic hydrocarbons.

While only limited number of specific embodiments of the invention have been expressly disclosed it is, nonetheless, to be broadly construed and not to be limited except by the character of the claims appended hereto.

What we claim is:

1. A catalyst in reduced form containing Mg and Ni in a molar ratio of (0.0075 to 0.075): 1, and a water-insoluble support in an amount of 17.0 to 60.0 grams of support per mol of Ni, wherein active nickel metal surface area is 110 to 180 m$^2$/g of Ni, and 65 to 97% of a BET total surface area is formed by pores of radius $r_p \leq 2.5$ nm.

2. The catalyst of claim 1 wherein said BET total surface area is 160 to 450 m$^2$/g of said catalyst.

3. The catalyst of claim 2 wherein said BET area is 180 to 380 m$^2$/g of said catalyst.

4. The catalyst of claim 3 wherein said BET area is 200 to 350 m$^2$/g of said catalyst.

5. The catalyst of claim 1 wherein Mg and Ni are present in a catalyst ratio of (0.015 to 0.06): 1.

6. The catalyst of claim 5 wherein said catalyst ratio is 0.022 to 0.055): 1.

7. The catalyst of claim 1 wherein said support is selected from the group consisting of calcium silicate, magnesium silicate, aluminum silicate, alumina, silica, and kieselguhr.

8. The catalyst of claim 7 wherein said support is selected from the group consisting of alumina, silica, and kieselguhr.

9. The catalyst of claim 8 wherein said support is kieselguhr.

10. The catalyst of claim 1 containing 25 to 50 g of said support per mol of Ni.

11. The catalyst of claim 10 containing 30 to 40 g of said support per mol of Ni.

12. The catalyst of claim 1 wherein said active surface area is 120 to 160 m$^2$/g of Ni.

13. The catalyst of claim 12 wherein said active surface area is 130 to 150 m$^2$/g of Ni.

14. The catalyst of claim 1 wherein 70% to 95% of said BET area is formed by pores having radii $r_p \leq 2.5$ nm.

15. The catalyst of claim 14 wherein 75% to 95% of said BET area is formed by pores having radii $r_p \leq 2.5$ nm.

16. The catalyst of claim 1 wherein 60% to 95% of said BET area is formed by pores having radii $r_p$ of 1.5 to 2.5 nm.

17. The catalyst of claim 16 wherein 70% to 95% of said BET area is formed by pores having radii $r_p$ of 1.5 to 2.5 nm.

18. The catalyst of claim 17 wherein 73% to 90% of said BET area is formed by pores having radii of 1.5 to 2.5 nm.

19. The catalyst of claim 1 wherein 35% to 85% of said BET area is formed by pores having radii $r_p$ of 1.8 to 2.5 nm.

20. The catalyst of claim 19 wherein 45% to 76% of said BET area is formed by pores having radii $r_p$ of 1.8 to 2.5 nm.

21. The catalyst of claim 20 wherein 50% to 70% of said BET area is formed by pores having radii $r_p$ of 1.8 to 2.5 nm.

22. A process for the preparation of the catalyst of claim 1 which comprises separately but simultaneously adding a solution containing nickel salts and magnesium salts and a solution of a basic precipitant at a constant pH from 6. to 8.5 at 90° to 110° C. to a support suspended in water, whereby there is formed a coprecipitate containing magnesium and nickel in a molar ratio of (0.02 to 0.25): 1, and wherein a molar ratio of magnesium to nickel is adjusted to a value of (0.0075 to 0.075): 1 by subsequent washing with water at 60° to 90° C. and said coprecipitate is dried and reduced.

23. The process of claim 22 wherein said catalyst is shaped before being dried and reduced.

24. A composition containing magnesium and nickel in non-reduced form in a catalyst molar ratio of (0.0075 to 0.075): 1, 17.0 to 60.0 g of a support per mol of said nickel, and 2% to 25% by weight of water, said composition prepared by coprecipitating a coprecipitate comprising said magnesium and said nickel in a precipitation molar ratio of (0.02 to 0.25):1 in the presence of 17.0 to 60.0 g of said support per mol of said nickel at a pH of 6 to 8.5 and a precipitation temperature of 90° to 110° C., and thereafter washing said coprecipitate with water at a washing temperature of 60° to 90° C.

* * * * *